United States Patent
Friedrichs

(10) Patent No.: US 7,596,823 B2
(45) Date of Patent: Oct. 6, 2009

(54) LYING-DOWN MEANS

(76) Inventor: Arno Friedrichs, Grünbaum 3, 95326 Kulmbach (DE)

( * ) Notice: Subject to any disclaimer, the term of this patent is extended or adjusted under 35 U.S.C. 154(b) by 13 days.

(21) Appl. No.: 11/660,615

(22) PCT Filed: Aug. 25, 2005

(86) PCT No.: PCT/EP2005/054172

§ 371 (c)(1),
(2), (4) Date: Feb. 16, 2007

(87) PCT Pub. No.: WO2006/024624

PCT Pub. Date: Mar. 9, 2006

(65) Prior Publication Data

US 2008/0086821 A1    Apr. 17, 2008

(30) Foreign Application Priority Data

Aug. 31, 2004 (DE) ..................... 10 2004 041 996

(51) Int. Cl.
*A47C 27/00* (2006.01)
(52) U.S. Cl. .................. 5/713; 5/710; 5/655.3
(58) Field of Classification Search ........... 5/710, 5/713, 658, 655.3, 706

See application file for complete search history.

(56) References Cited

U.S. PATENT DOCUMENTS

| 3,879,776 | A | | 4/1975 | Solen |
| 4,542,547 | A | * | 9/1985 | Sato ............................. 5/713 |
| 5,182,826 | A | * | 2/1993 | Thomas et al. ................. 5/713 |
| 5,829,081 | A | | 11/1998 | Pearce |
| 5,873,137 | A | * | 2/1999 | Yavets-Chen .................. 5/713 |

FOREIGN PATENT DOCUMENTS

| DE | 696 11 490 | 8/2001 |
| DE | 20 2004 000 701 U1 | 6/2004 |
| EP | 0 757 899 A1 | 2/1997 |

OTHER PUBLICATIONS

International Search Report.

* cited by examiner

*Primary Examiner*—Fredrick Conley
(74) *Attorney, Agent, or Firm*—Collard & Roe, P.C.

(57) ABSTRACT

The invention relates to a bed comprising a mattress with a plurality of air chambers arranged in a grid, each chamber being equipped with at least one air connection. The bed is also equipped with a plurality of controllable valves, each valve being assigned to one of the air chambers and several sensors. A control unit is connected to the sensors and controls the valves individually in accordance with the output signals of the sensors. In addition, the inventive bed comprises an air source that is connected to the valves.

19 Claims, 3 Drawing Sheets

LYING-DOWN MEANS

CROSS REFERENCE TO RELATED APPLICATIONS

Figure 1:
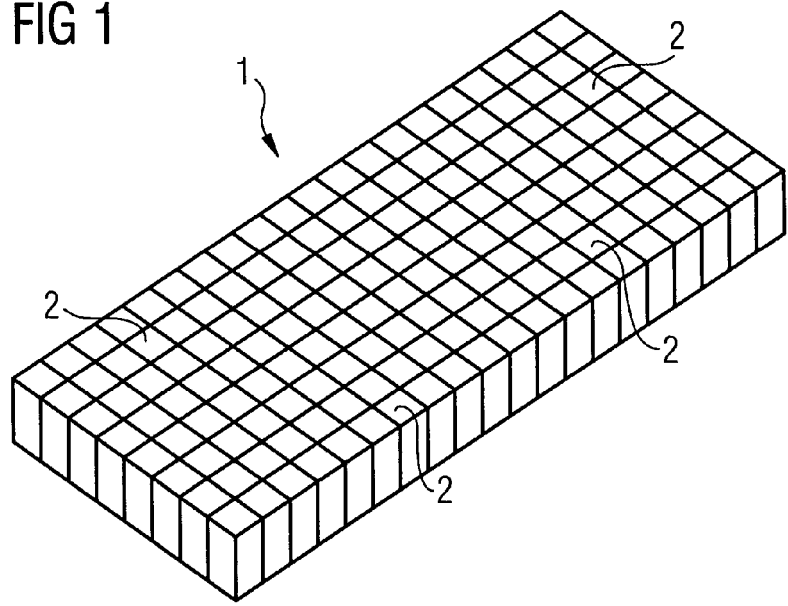

Applicant claims priority under 35 U.S.C. §119 of German Application No. 10 2004 041 996.5 filed Aug. 31, 2004. Applicant also claims priority under 35 U.S.C. §365 of PCT/EP2005/054172 filed Aug. 25, 2005. The international application under PCT article 21(2) was not published in English.

The invention relates to lying-down means.

Inflatable lying-down means are already known. A simple form of lying-down means of that kind is an air mattress. This has a single air chamber or multiple air chambers able or each able to be filled with air by way of an air connection, for example with use of a compressor. The respective air connection is closed by means of a plug after filling of the associated air chamber.

A mattress-cushion, which can be filled with compressed air, for an item of furniture for lying on is known from DE 20 2004 000 701 U1, wherein the mattress-cushion can be charged with compressed air by way of a compressor. At least one, preferably three additional, independent air chambers are provided on the upper side of the mattress-cushion in the region of the anticipated spinal curvature of the sleeping person. The air chambers extend over the entire width of the mattress-cushion. Each air chamber has a connection for a compressor so that each air chamber can be individually charged with compressed air.

A mattress with a firmness able to be regulated by the user is known from DE 696 11 490 T2. The mattress consists of a core with a structure consisting of a lined layer on each side and an upholstered layer similarly on each side. At least one of the lined layers is a reticular body usually with a prismatic-rectangular construction. The structure is based on a laminated-wall body subdivided by several transversely extending separations defining the mutually adjacent, transversely extending sealed air chambers. Each air chamber can be individually inflated so that depending on the respective pressure with which the transversely extending chambers of the reticular body were provided this body can have different degrees of firmness. In addition, a compressor installation is provided which is supported by an air reservoir and supplies the transversely extending air chambers with pressure by way of independently and individually controllable electric valves.

The invention has the object of improving the adaptation of lying-down means to the body of a person lying on the lying-down means.

This object is fulfilled by lying-down means with the features indicated in claim 1.

Advantageous embodiments and developments of the invention are evident from the dependent claims.

Lying-down means with the features according to the invention has the advantage that filling of the individual air chambers is undertaken under sensor control by a control unit. If the sensors are pressure sensors, then it can be achieved that a predetermined permissible maximum pressure is not exceeded in each air chamber. It is thereby ensured that bursting of an air chamber, which could be connected with unpleasant consequences for the person lying on the mattress, does not occur. If the sensors are height sensors, then the air feed to each of the air chambers can be set so that the respective air chamber has a desired height. This desired height is preferably dependent on a set mattress profile. If the sensors are position sensors, then the mattress profile can be varied in dependence on the detected position of a person lying on the mattress. If, for example, the person lying on the mattress lies on their stomach, then the mattress profile can be so varied with use of stored data associated with the stomach position that the air chambers positioned in the stomach region of the person are filled with more air than the air chambers positioned in the region of the head and the legs of the person, so that the person is not in a hollow back position. If, thereagainst, the person lying on the mattress lies on their side, then the mattress profile can be so varied with use of stored data associated with the side position that the spinal column of the person lying on the mattress is straight. If the person lying on the mattress lies on their back, then the mattress profile can be so varied with use of stored data associated with the back position that the head is elevated relative to the lying posture and the region of the back lowered to some extent. In that case the body size, body weight and exact positioning of the person lying on the mattress can be similarly taken into consideration by an additional evaluation of the signals supplied by the pressure sensors.

According to one embodiment of the invention data corresponding with a predetermined mattress profile are stored in a mattress profile memory. These data can be called up by the user by means of a control unit and used for setting a desired mattress profile. In addition, the signals supplied by the sensors can be taken into consideration for this setting.

It is particularly advantageous to automatically set a pre-programmed sequence of mattress profiles in succession under control by the control unit. This has the consequence that the person lying on the mattress is quite often rearranged during sleep, wherein the pressure exerted on the individual body locations is varied and the spinal column moved. A bedsore is thereby also prevented or at least delayed in its onset.

The air source preferably comprises a piston driven by a linear motor and reciprocatingly movable in a piston housing. In an air source designed in that manner the introduction and letting out of the air takes place in almost noise-free manner. Contribution to that is also made particularly by the air flow running only very slowly.

An advantageous embodiment of the air chambers is indicated in claim 13. If the air chambers are each realised in the form of a bellows, then this assists setting of a desired height and a desired pressure in each of the air chambers. In addition, mutually adjacent air chambers can be interconnected in simple manner by a vulcanisation process, wherein this vulcanisation process is preferably carried out in the central or lower region of the air chambers.

An advantageous development of the invention consists in connecting the processor with a display and using the display for illustration of mattress profiles. The user in case of need can then modify stored mattress profiles in accordance with his or her individual wishes such that the respective mattress profile is better adapted to his or her individual feeling.

If a lying-down means comprises a records memory, as is the subject of claim 15, then set mattress profiles are stored. The user has the possibility of subsequently evaluating these set mattress profiles and in this manner drawing conclusions about his or her sleeping behaviour.

The data stored in the records memory can also be automatically evaluated by the processor or transmitted by way of an on-line connection to a remotely arranged central processor. The latter makes it possible, even at a distance, to undertake evaluation of the sleeping habits of a sleeping person and remotely initiate setting of changed mattress profiles.

Figure 2:
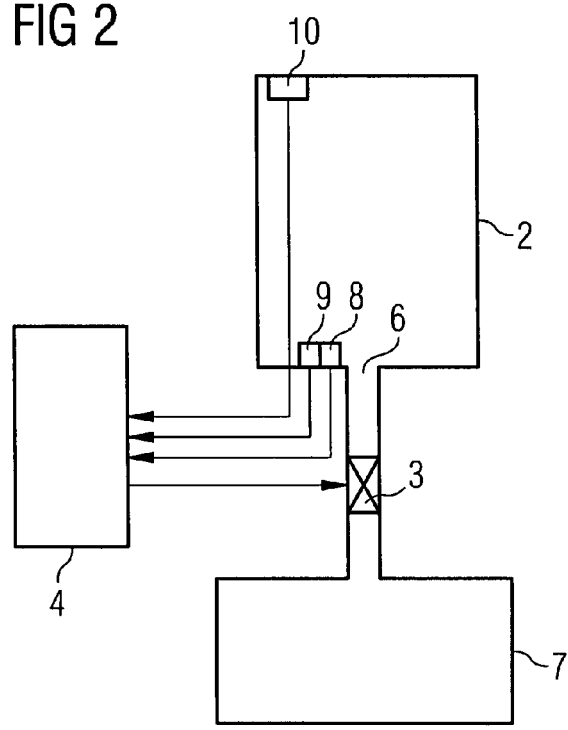
Figure 3:
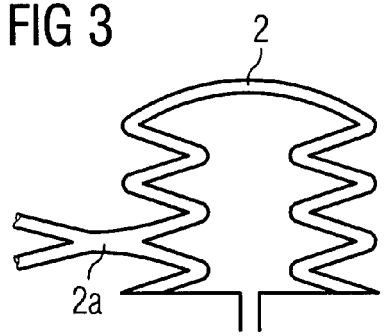
Figure 4:
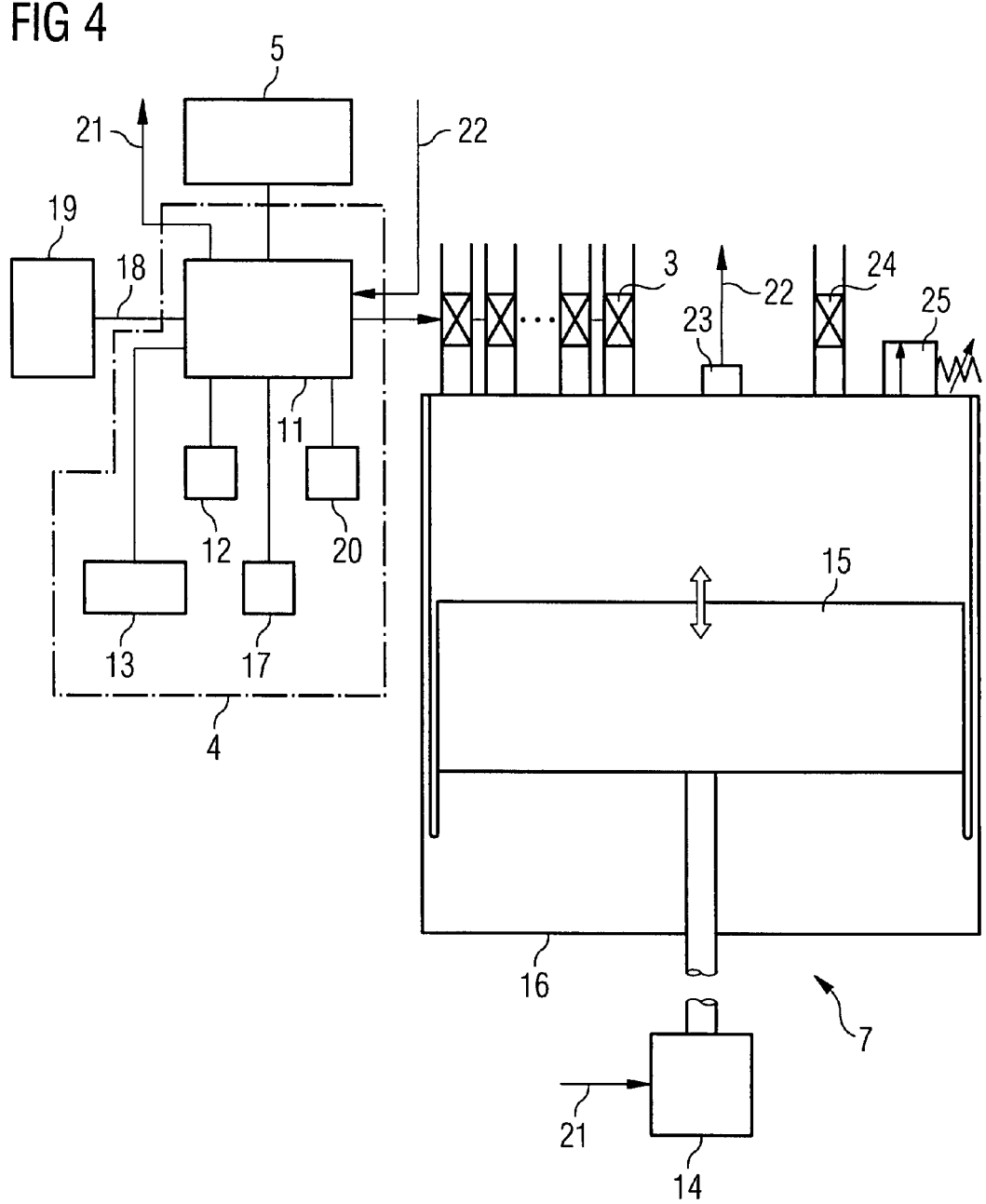

Further advantageous characteristics of the invention are evident from the explanation thereof by way of example and with reference to the figures, in which:

FIG. 1 shows a schematic perspective view of a mattress used in the lying-down means according to the invention, FIG. 2 shows an illustration for explanation of the functioning of lying-down means according to the invention, FIG. 3 shows a schematic view for clarification of a preferred form of construction of an air chamber, FIG. 4 shows a further illustration for explanation of the functioning of lying-down means according to the invention and FIG. 5 shows diagrams of an example of embodiment for measuring the height of an air chamber.

FIG. 1 shows a schematic perspective view of a mattress used in the lying-down means according to the invention. The illustrated mattress 1 has a plurality of air chambers 2 in grid arrangement. Each of these air chambers has a square, rectangular or round base area. In the case of a square base area each chamber has, for example, a length and a width in the region between 4 and 10 centimeters. The height of each air chamber can be set in dependence on the supplied air quantity, for example in the region between 6 and 12 centimeters. The total length of the mattress is, for example, 200 centimeters and its width 100 centimeters.

Each of the air chambers 2 of the mattress 1 can be individually pumped up with air so that for each individual one of the air chambers the air pressure prevailing there and the height are individually settable. This individual pumping of an air chamber is illustrated in connection with FIG. 2, which shows an illustration for clarification of the functioning of lying-down means according to the invention.

The air chamber 2 illustrated there has an air connection 6 connected by way of a valve 3 with a compressed air source 7. The valve 3 is opened and closed by control signals provided by a control unit 4. The control unit 4, which comprises a processor, generates the said control signals in dependence on sensor output signals applied thereto.

The air chamber 2 illustrated in FIG. 2 has, similarly to all other air chambers of the mattress, a pressure sensor 8, a height sensor 9 and a position sensor 10. The output signals of the said sensors are fed to the control unit 4, evaluated by the processor thereof and converted into a control signal for the valve 3, whereby the valve is opened or closed and thus allows passage or blocks. It is optionally also possible to manage with less position sensors in order to detect the lying position of the person lying on the mattress. A single position sensor located in one of the air chambers is possibly sufficient for that purpose.

The air pressure prevailing in the respective air chambers can be monitored, by evaluation of the sensor signals supplied by the pressure sensor 8, with regard to whether or not it corresponds with a desired mattress profile. In addition, the air pressure in the respective air chamber can be monitored, by evaluation of the output signals of the pressure sensor 8, so that it does not exceed a predetermined permissible maximum pressure. It is thereby ensured that an air chamber cannot undesirably burst and place at risk the person lying on the mattress. In addition, in order to avoid bursting of air chambers of the mattress, the air of the air pressure source 7 can also be limited by means of a mechanical excess pressure valve 25 (see FIG. 4), wherein the excess pressure valve is, for example, integrated in the duct connecting plate for the air chamber feeds. Additionally or alternatively it is also possible to provide for that purpose an electric control valve 24 controlled in drive by the control unit 4 (see FIG. 4).

Through evaluation of the sensor signals supplied by the height sensor the height of the respective air chamber can be monitored with regard to whether it corresponds with or has to be adapted to the currently set mattress profile. The height measurement is carried out in that, for example, a reflective layer is applied to the underside of the upper boundary wall of the air chamber and the spacing of the reflective layer from the height sensor 9 is detected.

Through evaluation of the control signals supplied by the position sensors 10 it can be determined whether the person lying on the mattress lies on their stomach, back or side and a mattress profile associated with the respective position of lying can be set. For this positional determination, for example, various signal transmitters are fastened, such as sewn, in the region of the upper edge of the pyjama pants of a person sleeping on the mattress. A first transmitter is located in the region of the back, a second transmitter in the region of the stomach, a third transmitter on the lefthand side and a fourth transmitter on the righthand side. If these signal transmitters are disposed in the vicinity of one of the position sensors 10, then the respective position sensor delivers to the control unit 4 an individually characteristic identifying signal on the basis of which the control unit recognises, with use of data stored in a lying-down profile memory, whether the person lying on the mattress lies on their stomach, back, lefthand side or righthand side. If, for example, the person lies on their back, then merely the signal transmitter arranged in the region of the back causes a report, by way of the position transmitter 10 arranged in the vicinity, to the control unit 4. All other signal transmitters are spaced so far from the respective closest position signal that the further position sensors do not deliver signals. Consequently, in this case the control unit 4 sets a mattress profile corresponding with a person sleeping on their back. For this purpose the control unit 4 uses data stored in a mattress profile memory.

FIG. 3 shows a schematic view for illustration of a preferred form of construction of an air chamber. This is realised in the form of a bellows consisting of a soft plastics material. If air is pumped into this air chamber from the underside then the folds extend in the sense that the height of the air chamber enlarges. If, thereagainst, air is let out of the air chamber then the bellows collapses again so that the height of the air chamber reduces. Mutually adjacent bellows the mattress 1 is—as illustrated by the contact member 2*a* depicted in FIG. 3—interconnected by a vulcanisation process. This connection of mutually adjacent bellows is located in the centre or lower region of the respective bellows. Setting of the desired height of a bellows is thereby not impaired. For reasons of clarity the sensors disposed in the air chamber 2 are not illustrated in FIG. 3.

Alternatively to the form of construction illustrated in FIG. 3 the air chambers can also be realised in the form of a telescopic piston-cylinder connection.

FIG. 4 shows a further illustration for explanation of the functioning of lying-down means according to the invention. In this figure, in particular, the control unit 4 and the air source 7 are shown in more detail.

The air source comprises a piston housing 16 within which a piston 15 is reciprocatingly movable. On upward movement of the piston 15 air is urged in the direction of the valves 3 of the air chambers. If the respective valve is open, then the air urged through the valve is pumped into the respective air chamber. On downward movement of the piston air can—insofar as the respective valve is open—be let out of the respectively associated air chamber. The movement of the piston 15 is produced by a linear motor 14 which in turn is acted on by control signals fed thereto by the control unit 11 via a motor control line 21. The control unit 11 ensures that a valve for pumping in or letting out air is open during the upward or downward movement of the piston only if the pressure in the respective air chamber corresponds with the air pressure prevailing in the pump chamber of the piston housing. For this purpose a pressure sensor 23 is also provided in the region of the piston housing, the output signal of the pressure sensor being supplied to the control unit 4 by way of a line 22.

The advantage of a design of the air source 7 of that kind consists in that the introduction of the air into the air chambers of the mattress and the letting out of air from the air chambers of the mattress takes place without noise. This is attributable to the fact that the piston 15 has to move in the piston 16 only very slowly, since a change in the air pressure in the air chambers is to take place not abruptly, but slowly. This has the advantage that change in the air pressure takes place imperceptibly for the person lying on the mattress.

The control of the valves is carried out—as was already explained above—by control signals, which are made available by the control unit, for each of the valves and thus for each air chamber individually.

The control unit 4 comprises a processor 11, a mattress profile memory 12, a keyboard 13 as input means, a records memory 17 and a lying-down profile memory 20. The processor 11 is connected with a display 5 as well as with, by way of an on-line connection 18, a remotely arranged central processor 19. The latter is located in, for example, a hospital, a medical practice or a sleep investigation institute. In addition, the processor 11 is connected with the linear motor 14 by way of the motor control line 21. Also available to the processor—which is not illustrated in FIG. 4, but apparent from FIG. 2—are the sensor signals derived from the pressure sensors 8, height sensors 9 and position sensors 10.

The illustrated means has several working modes, which can be initiated by way of the keyboard 13.

A first working mode consists in selection of a desired mattress profile by means of the control keyboard 13 and setting it by means of the processor 11. For this purpose data corresponding with a plurality of different mattress profiles were filed beforehand in the mattress profile memory 12. Each of these data sets is selectable by way of the control buttons 13 in the sense of selection of a desired mattress profile. The processor 11 addresses, as a reaction to the input control commands, the mattress profile memory 12 in such a manner that the respectively desired data set is read out of the mattress profile memory 12 and controls the linear motor 14 and the valves of the air chambers in such a manner that the desired mattress profile is set. Each of the mentioned data sets in that case contains, with respect to each individual one of the air chambers, data about the pressure and height.

If the desired mattress profile has been set, the processor 11 then monitors maintenance of this setting with consideration of the input signals supplied thereto and initiates, if needed, adaptations by appropriate drive control of the linear motor 14 and the valves 3 of the air chambers. In addition, the processor 11 monitors the pressure in each individual air chamber in the manner that a permissible maximum pressure fixed in advance is not exceeded. If the processor 11 recognises that the air pressure in one of the chambers corresponds with the maximum permitted pressure then it opens the associated valve in order to let air out of this chamber.

In order to prevent the air chambers from completely relaxing when the person lying on the mattress rises, a limiter element can be provided in each air chamber. This limiter element has the effect that a predetermined maximum permissible height of the air chambers is not exceeded. Damage or even destruction of the air chambers is thereby avoided. If the air chambers are realised as bellows, the limiter element can be, for example, a cord.

A bias pressure is preferably applied to each air chamber in the unloaded state of the mattress. Regulation to a desired mattress profile is carried out only when a person lies on the mattress again.

A further operating mode consists in initiating rundown of a predetermined sequence of mattress profiles by means of the control keyboard. This sequence of mattress profiles was established beforehand and serves for repeated redisposition of the person lying on the mattress. It can thereby be achieved that the spinal column of the person lying on the mattress is, for example, moved in predetermined manner during sleep so that the said person does not have back pains after awakening. In the case of sick patients hardly able to move themselves it can be achieved by repeated change in the mattress profile that the pressure on specific body parts, for example the heels or shoulders, does not remain constantly high over a lengthy period of time. Occurrence of a bedsore can thereby be avoided or at least delayed in its onset. In addition, in this operating mode the input signals supplied by the sensors to the compressor 11 are additionally taken into consideration so as to maintain the respectively desired mattress profile and adapt it to the body of the person lying on the mattress.

A third working mode consists of automatically setting, by evaluation of the lying position of the person lying on the mattress, a mattress profile adapted to the detected lying position. For this purpose data corresponding with mattress profiles adapted to the respective lying position were stored in advance in the resting profile memory 12. One possible lying position is the stomach position, a second lying position is the back position, a third lying position is lying on the lefthand body side, and a fourth lying position is lying on the righthand body side. The respectively associated mattress profiles are of such a kind that in each instance the person lying on the mattress is supported in a comfortable manner kind to the spinal column.

Detection of the lying position is carried by evaluation of the output signals of the position sensors 10. These co-operate with signal transmitters fastened, for example sewn, in the pyjama pants of the person lying on the mattress. Thus, a signal transmitter of that kind is respectively provided in the back region, in the stomach region, on the lefthand side and on the righthand side of the pyjama pants, wherein these signal transmitters issue signals distinguishable from one another. The signals are, if the respective signal transmitter is located sufficiently close to one of the position sensors 10, detected by this and passed on to the control unit 4. If, for example, the person lying on the mattress lies on their back, then exclusively the position sensor 10 located in the back region of the pyjama pants is sufficiently close to the signal transmitter, so that merely this position sensor passes on a signal to the control unit 4. As a reaction to reception of this signal the control unit addresses the lying-down profile memory 20 in such a manner that those data corresponding with the detected lying position are read out of the memory. These data are employed by the control unit 4 to make available suitable drive control signals for the linear motor 14 and the valves of the air chambers 2. The lying-down profile memory 20 and the mattress profile memory 12 can optionally be realised as a single memory.

The aforesaid forms of operation can also be combined with one another, whereby adaptation of the mattress profile to the body of the person lying on the mattress is further enhanced.

An advantageous embodiment of the invention consists in representing data, which corresponds with the mattress profiles, in suitable form on the display 5. The user has the possibility of undertaking, by way of the display illustration, selective changes, which correspond with his or her individual preferences, to the mattress profiles. Also in this area are, for example, a massage and a ventilation by selective movement up and down of individual chambers.

Another advantageous embodiment of the invention consists in providing a records memory 17 in which, for example, the set mattress profiles are recorded for the duration of a night. The recorded data can subsequently be represented on the display 5. This allows conclusions with respect to whether the sleeping person predominantly sleeps on the stomach, back or side, whether he or she frequently or seldom turns during sleep, etc.

Evaluation of the recorded data can alternatively also be carried out by means of a remotely located central computer 19 coupled with the control unit 4 by way of an on-line connection 18. This central computer is in, for example, a hospital. It is thereby made possible for a doctor to analysis the sleeping habits of one of his or her patients and if needed to also selectively remotely vary set mattress profiles in that the doctor transmits to the control unit 4 by way of the on-line connection 18 new data corresponding with changed mattress profiles.

Figure 5A:
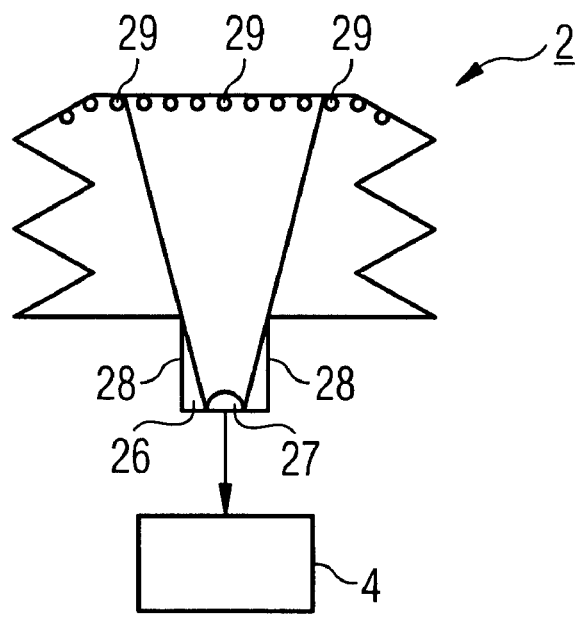
Figure 5B:
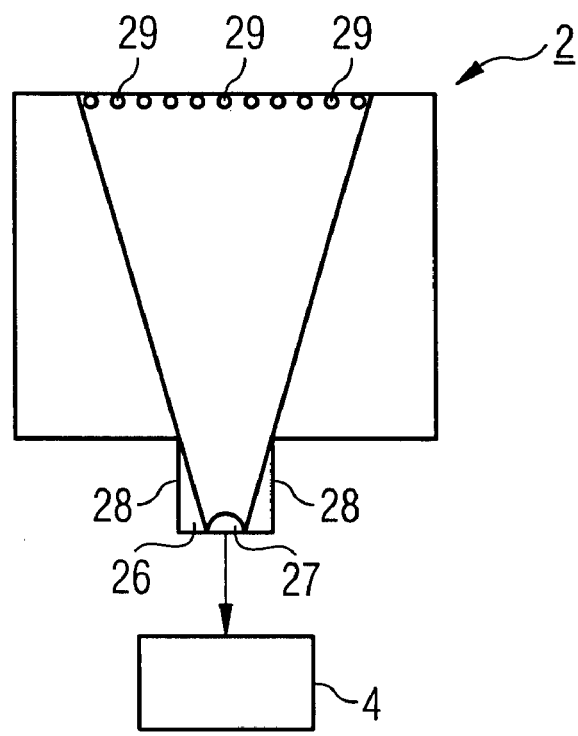

FIG. 5 shows diagrams of an example of embodiment for measuring the height of an air chamber in which the height sensor has an image recording element. According to this example of embodiment the base of the air chamber 2 is provided with a recess 26 with the image recording element 27 arranged in the lower region thereof. This image recording element 27 is directed upwardly in the direction of the upper side of the air chamber. The pick-up region of the image recording element 27 is laterally bounded by the side walls 28 of the recess 26. A plurality of marking points 29 is provided at the inner surface of the upper side of the air chamber. If the air chamber is filled with only a small amount of air, the height of the air chamber is low and only a comparatively small number, which is dependent on the height of the air chamber, of the marking points 29 is contained in the pick-up region of the image recording element 27. This state is illustrated in FIG. 5*a*. If, thereagainst, the air chamber is completely filled with air, the height of the air chamber is large and all marking points are contained in the pick-up region of the image recording element. This state is illustrated in FIG. 5*b*. The output signal of the image recording element 27 is transmitted to the control unit 4. This determines from the received signal the number of detected marking points 29 respectively present and then from that the height of the air chamber.

REFERENCE NUMERAL LIST 1 mattress
2 air chamber
2*a* contact member of an air chamber
3 valve
4 control unit
5 display
6 air connection
7 air source
8 pressure sensor
9 height sensor
10 position sensor means, position sensor
11 processor
12 mattress profile memory
13 input means; keyboard
14 linear motor
15 piston
16 piston housing
17 records memory
18 on-line connection
19 central computer
20 lying-down profile memory
21 motor control line
22 line to the control unit
23 pressure sensor
24 electric safety valve
25 mechanical excess pressure valve
26 recess
27 image recording element
28 side walls
29 marking points

The invention claimed is:

1. Lying-down means comprising
   a mattress (1) with a plurality of air chambers (2) in grid arrangement and each having at least one air connecting means (6)
   a plurality of controllable valves (3) each associated with a respective one of the air chambers for pumping in air into the air chamber and letting out air from the air chamber,
   a plurality of sensors, one of said sensors being a pressure sensor,
   a control unit (4) connected with the sensors and individually controlling the valves (3) in dependence on output signals of the sensors and
   an air source (7) connected with the valves,
   wherein the air source (7) comprises a piston (15) driven by a linear motor (14) and reciprocatingly movable in a piston housing (16) having a pump chamber,
   wherein the control unit (4) controls the valves (3) in such a way that a valve for pumping in or letting out air is open during the upward or downward movement of the piston only if the pressure in the respective air chamber corresponds with the air pressure prevailing in the pump chamber, and
   wherein the piston housing has the pressure sensor, the pressure sensor having an output signal supplied to the control unit for enabling the control unit to ensure that the valve for pumping in or letting out air is open during the upward or downward movement of the piston only if the pressure in the respective air chamber corresponds with the pressure prevailing in the pump chamber of the piston housing.

2. Lying-down means according to claim 1, wherein a respective pressure sensor (8) is associated with each air chamber (2) for detection of the air pressure prevailing in the air chamber and the pressure sensors are each connected with the control unit (4).

3. Lying-down means according to claim 1, wherein a respective height sensor (9) is associated with each air chamber for detecting the height of the air chamber and the height sensors are each connected with the control unit (4).

4. Lying-down means according to claim 1, wherein the mattress comprises a position sensor means (10) provided for detection of the lying position of a person lying on the mattress and that the position sensor means is connected with the control unit (4).

5. Lying-down means according to claim 1, wherein at least one of the air chambers of the mattress has a position sensor (10).

6. Lying-down means according to claim 1, wherein the control unit (4) comprises a processor (11) providing control signals for the valves in dependence on the supplied sensor signals.

7. Lying-down means according to claim 6, wherein the processor (11) recognizes the lying position of a person lying on the mattress by evaluation of signals supplied by the position sensors (10), calls up data corresponding with a mattress profile respective to the resting position from the lying-down profile memory (20) and converts the read-out data into control signals for the valves.

8. Lying-down means according to claim 6, wherein the processor (11) is connected with a display (5) and the display serves for illustrating the mattress profiles.

9. Lying-down means according to claim 1, further comprising input means (13) for input of control commands.

10. Lying-down means according to claim 9, wherein the input means (13) are provided for input of the control command by way of which one of the mattress profiles is selected.

11. Lying-down means according to claim 9 wherein the input means (13) are provided for input of the start command by way of which the control unit generates for the valves control signals causing setting of a predetermined sequence of mattress profiles.

12. Lying-down means according to claim 1, wherein the control unit comprises a processor (11) connected with a mattress profile memory (12), wherein data corresponding with mattress profiles are stored in the mattress profile memory (12) and wherein the processor calls up data corresponding with a mattress profile from the mattress profile memory (12) and converts the data into control signals for the valves.

13. Lying-down means according to claim 1, wherein the air chambers (2) are each realized in the form of a bellows or in the form of a telescopic piston-cylinder unit.

14. Lying-down means according to claim 1, wherein the air chambers each have a limiter element limiting the maximum height of the air chamber.

15. Lying-down means according to claim 1, further comprising a records memory (17) provided for storing data corresponding with set mattress profiles.

16. Lying-down means according to claim 15, wherein the data corresponding with the set mattress profiles are read out of the records memory (17) and are illustrated on the display (5) and/or supplied for evaluation by the processor (11).

17. Lying-down means comprising
a mattress (1) with a plurality of air chambers (2) in grid arrangement and each having at least one air connecting means (6),
a plurality of controllable valves (3) each associated with a respective one of the air chambers,
a plurality of sensors, one of said sensors being a height sensor,
a control unit (4) connected with the sensors and individually controlling the valves (3) in dependence on output signals of the sensors and
an air source (7) connected with the valves,
wherein the control unit (4) comprises a processor (11) providing control signals for the valves in dependence on the supplied sensor signals, and
wherein the height sensor has an image recording element (27), an inner surface of an upper side of an air chamber is provided with a plurality of marking points and the control unit determines the height of the air chamber in dependence on the number of detached marking points.

18. Lying-down means according to claim 17, wherein a base of the air chamber is provided with a recess (26) and the image recording element is arranged in a lower region of the recess.

19. Lying-down means according to claim 18, wherein a pick-up region of the image recording element (27) is laterally bounded by side walls (28) of the recess.

\* \* \* \* \*